United States Patent
Mutz et al.

(10) Patent No.: US 6,492,985 B1
(45) Date of Patent: Dec. 10, 2002

(54) PRESENTING MANIPULATING AND SERVING IMMERSIVE IMAGES

(75) Inventors: Andrew H. Mutz, Palo Alto, CA (US); Trajan E. Unger, Mountain View, CA (US); Adam Sah, Berkeley, CA (US); Daniel A. Stryker, San Francisco, CA (US); Joseph R. S. Molnar, Toronto (CA)

(73) Assignee: Internet Pictures Corporation, Oak Ridge, TN (US)

( * ) Notice: Subject to any disclaimer, the term of this patent is extended or adjusted under 35 U.S.C. 154(b) by 0 days.

(21) Appl. No.: 09/347,777

(22) Filed: Jul. 6, 1999

(51) Int. Cl.[7] ............................................... G06T 15/00
(52) U.S. Cl. ...................................................... 345/419
(58) Field of Search ........................... 345/419; 707/513

(56) References Cited

U.S. PATENT DOCUMENTS

| | | | |
|---|---|---|---|
| 5,253,341 A | 10/1993 | Rozmanith et al. | 395/200 |
| 5,392,388 A | 2/1995 | Gibson | 395/159 |
| 5,703,604 A | * 12/1997 | McCutchen | 345/8 |
| 5,990,941 A | * 11/1999 | Jackson et al. | 348/207 |

FOREIGN PATENT DOCUMENTS

| | | |
|---|---|---|
| WO | WO 97/01241 | 1/1997 |
| WO | WO 97/31482 | 8/1997 |
| WO | WO 98/49643 | 11/1998 |
| WO | PCT/US 00/17745 | 6/2000 |

* cited by examiner

*Primary Examiner*—Mark Zimmerman
*Assistant Examiner*—Lance W. Sealey
(74) *Attorney, Agent, or Firm*—Victor C. Moreno; John P. Colbert

(57) ABSTRACT

According to the invention, computerized methods, computer-readable medium containing computer-executable instructions, and apparatus are disclosed for presenting, manipulating, and serving immersive (i.e., panoramic) images. A browser or other display mechanism presents various views of the immersive image comprised of one or more sub-images received from a server, memory, or stored device. Additionally, a server is able to discriminate which type of Web page is provided for efficiently presenting views of an immersive image based on the capabilities of the viewing browser. In this manner, a user is able to efficiently view an immersive image without requiring a Java or other enhance capability browser. Moreover, the invention also provides for determining and presenting a reference indicator which identifies the portion of the immersive image. The reference indicator can also be manipulated to display new perspective views of the immersive image.

45 Claims, 10 Drawing Sheets

PRESENTING MANIPULATING AND SERVING IMMERSIVE IMAGES

FIELD OF THE INVENTION

This invention relates to computer programming and systems; and more particularly, to computerized methods, computer-readable medium containing computer-executable instructions, and apparatus for presenting, manipulating, and serving immersive (i.e., panoramic) images.

BACKGROUND OF THE INVENTION

The Internet and the World Wide Web ("Web") have changed the landscape of information delivery and affected numerous faculties of life, including electronic commerce and entertainment. One area that has benefited from this technological development is the ability to deliver and display multimedia experiences across a network, such as the Internet. In particular, these multimedia experiences may include presenting immersive images.

Today, immersive images can be viewed using a Java capable browser or an enhanced browser having an appropriate plugin. A example of an immersive image 100 viewable using a Java capable browser or an enhanced browser having an appropriate plugin is illustrated in FIG. 1.

However, there is a large portion of the Internet community which cannot view immersive images today. To view these immersive images, these users would need to expend additional time and expense to replace or upgrade their browser. Moreover, a segment of the Internet community (e.g., WebTV users) cannot upgrade their system to be able to view immersive images using available technology. Needed is a system for presenting immersive images received from a server using generic browsing capabilities.

Moreover, current programs, including Java reviewers, for displaying immersive images do not provide a mechanism to alert a viewer of the currently displayed perspective of the immersive images. This results in the loss of viewing context. Needed is a mechanism for allowing a user to readily orient oneself and determine the perspective of the current view of the immersive image.

SUMMARY OF THE INVENTION

According to the invention, methods and apparatus are disclosed for presenting immersive images (i.e., panoramic images) and/or supporting the presentation of immersive images. Embodiments of the present invention include various elements and limitations, with no one element or limitation contemplated as being a critical element or limitation. Each of the claims individually recite as aspect of the present invention in its entirety. Moreover, embodiments of the present invention include methods, computer-readable medium containing instructions for performing the methods, and computer systems for practicing the present invention. The embodiments described hereinafter embody various aspects and configurations within the scope and spirit of the present invention.

According to a first embodiment of the present invention, a method and computer-readable medium containing executable instructions by a browser are provided for presenting an immersive image comprising a plurality of sub-images. Preferably, the first embodiment comprises: receiving a first set of instructions for presenting a first view of the immersive image, the first view including a first subset having one or more neighboring sub-images from the plurality of sub-images; receiving the first subset of sub-images from one or more local or remote memories, storage devices, or servers; remote memories, storage devices, or servers; and presenting the second view of the immersive image.

In an embodiment, the immersive image consists of a number N sub-images, and the first and second views each consist of non-overlapping portions of the immersive image. In alternative embodiments, the n sub-images may contain overlapping portions of the immersive image. Preferably, the value of n is eight and the value of m is two.

In an embodiment, one or more sub-images with the second subset not residing in a local memory or storage device are received from a remote server. An embodiment further comprises: requesting a second set of instructions for presenting the second view from a remote server; and receiving the second set of instructions for presenting the second view. Preferably, the first and second sets of instructions are HyperText Markup Language (HTML). In an embodiment, the first set of instructions are in HyperText Markup Language (HTML) and include a Java Script code; wherein, in response to the received signal, the Java Script code causes the presentation of the second view to be performed. In an embodiment, the signal is received in response to a selection by a user of the computer system. In an embodiment, the signal is received in response to a timing signal generator. An embodiment further comprises presenting a reference indicator having a plurality of views, wherein a first view of the reference indicator corresponds to the first view of the immersive image, and a second view of the reference indicator corresponds to the second view of the immersive image. Preferably, the second view is determined from a location indicated by the signal and a position of, or a point within, the reference indicator.

According to a second embodiment of the present invention, a method and computer-readable medium containing computer-executable instructions are provided for presenting an immersive image, where the immersive image includes a plurality of sub-images. Preferably, the second embodiment comprises: receiving a first view instructions, the first view instructions referencing a first and second sub-images of the plurality of sub-images; receiving the first and second sub-images; presenting a first view of the immersive image based on the first view instructions and including the first and second sub-images; receiving a signal indicating a request for a second view of the immersive image; requesting a second view instructions from one or more local or remote memories, storage devices, of servers in response to the received signal; receiving the second view instructions, the second view instructions referencing the second sub-image and a third sub-image; receiving the third sub-image; and presenting the second view of the immersive image based on the second view instructions and including the second and third sub-images.

In an embodiment, the first and second view instructions are in HyperText Markup Language (HTML). Preferably, the first, second and third sub-images, the first and second view instructions are received from one or more remote servers. In an embodiment, the signal is received in response to a selection by a user of the computer system. In an embodiment, the signal is received in response to a timing signal generator. In an embodiment, the first and second sub-images consist of non-overlapping neighboring portions of the immersive image. An embodiment further comprises presenting a reference indicator having a plurality of views, wherein a first view of the reference indicator corresponds to the first view of the immersive image, and a second view of the reference indicator corresponds to the second view of the immersive image. Preferably, the second view is determined from a location indicated by the signal and a position of, or a point within, the reference indicator.

According to a third embodiment of the present invention, a method and computer-readable medium containing computer-executable instructions are provided for presenting an immersive image using a browser, wherein, the immersive image including a plurality of sub-images. Preferably, the third embodiment comprises: receiving a first view instructions, the first view instructions including a browser executable code; receiving a first and second sub-images of the immersive image; presenting a first view of the immersive image based on the first view instructions and including the first and second sub-images; receiving a signal indicating a request for a second view of the immersive image; determining by the browser executable code the second view of the immersive image based on the received signal, the second view including the second and third sub-images; requesting a third sub-image of the immersive image from one or more local or remote memories, storage devices, or servers; receiving the third sub-image; and presenting the second view of the immersive image.

In an embodiment, the first view instructions are in HyperText Markup Language (HTML), and the browser executable code is in Java Script. An embodiment further comprises presenting a reference indicator having a plurality of views, wherein a first view of the reference indicator corresponds to the first view of the immersive image, and a second view of the reference indicator corresponds to the second view of the immersive image. Preferably, the second view is determined from a location indicated by the signal and a position of, or a point within, the reference indicator. In an embodiment, the first, second and third sub-images and the first view HTML source are received from one or more remote servers.

According to a fourth embodiment of the present invention, a method and computer-readable medium containing computer-executable instructions are provided for presenting an immersive image. Preferably, the fourth embodiment comprises: presenting a first immersive image view of the immersive image; presenting a first reference indicator indicating a first viewing perspective of the first immersive image view within the immersive image; receiving a signal indicating a request for a second view of the immersive image; determining the second view of the immersive image representing an angular displacement from the first immersive image view of the immersive image based on the received signal; presenting a second immersive image view of the immersive image; and presenting a second reference indicator indicating a second viewing perspective of the second immersive image view within the immersive image.

In an embodiment, the signal is received in response to a selection by a user of the computer system. Preferably, the second immersive image view is determined from a location indicated by the signal and a position of, or a point within, the reference indicator. In an embodiment, the immersive image is presented with a browser using Java executable code. In an embodiment, the immersive image is presented with a browser using Java Script executable code. In an embodiment, the immersive image is presented with a browser using a first HyperText Markup Language (HTML) page for presenting the first immersive image view of the immersive image, and a second HTML page for presenting the second immersive image view of the immersive image.

According to a fifth embodiment of the present invention, a method and computer-readable medium containing computer-executable instructions by a server are provided for providing a client with a plurality of sub-images of an immersive image. Preferably, the fifth embodiment comprises: receiving from the client a request to view the immersive image; sending to the client a first view HyperText Markup Language (HTML) source identifying at least a first sub-image of the immersive image; sending to the client the first sub-image of the immersive image; receiving a request from the client to view a second view of the immersive image; sending to the client a second view HTML source identifying at least a second sub-image of the immersive image; and sending to the client the second sub-image of the immersive image.

An embodiment further comprises generating the plurality of sub-images from the immersive image, the generated sub-images including the first and second sub-images. Preferably, generating the plurality of sub-images is performed in response to the receipt of the request to view the immersive image. Preferably, the embodiment further comprises determining whether or not the plurality of sub-images already exist; wherein the step of generating the plurality of sub-images is performed after determining that the plurality of sub-images do not already exist. Preferably, the first and second sub-images consist of non-overlapping neighboring portions of the immersive image. Preferably, the first and second sub-images contain overlapping portions of the immersive image.

An embodiment further comprises sending to the client a reference indicator. An embodiment further comprises: sending to the client a first view reference indicator corresponding to the first view of the immersive image; and sending to the client a second view reference indicator corresponding to the second view of the immersive image.

According to a sixth embodiment of the present invention, a method and computer-readable medium containing executable instructions by a server are provided for providing a client with a plurality of sub-images of an immersive image. Preferably, the method comprising: receiving from the client a request to view the immersive image; sending to the client a HyperText Markup Language (HTML) source containing a Java Script code identifying a first and second sub-images of the immersive image; sending to the client the first sub-image of the immersive image; receiving a request from the client for the second sub-image of the immersive image; and sending to the client the second sub-image of the immersive image. An embodiment further comprises generating the plurality of sub-images from the immersive image, the generated sub-images including the first and second sub-images.

According to a seventh embodiment of the present invention, a method and computer-readable medium containing executable instructions by a server are provided for supporting a browser to present an immersive image. Preferably, the method comprises receiving from the browser a request to view the immersive image; receiving an indication of an operational mode of the browser, the operational mode identifying a present mode to be used by the browser in presenting the immersive image; sending HTML code including a Java script and the immersive image to the browser if the present mode indicates Java enabled; and sending a first view HTML source and a first and second sub-images of the immersive image to the browser if the operational mode indicates not Java enabled. An embodiment further comprises dynamically generating the first and second sub-images directly from the immersive image in response to the receipt of the request to view the immersive image and operational mode of the browser.

BRIEF DESCRIPTION OF THE DRAWINGS

The appended claims set forth the features of the present invention with particularity. The invention, together with its advantages, may be best understood from the following detailed description taken in conjunction with the accompanying drawings of which:

DETAILED DESCRIPTION OF THE PREFERRED EMBODIMENT

Figure 2:
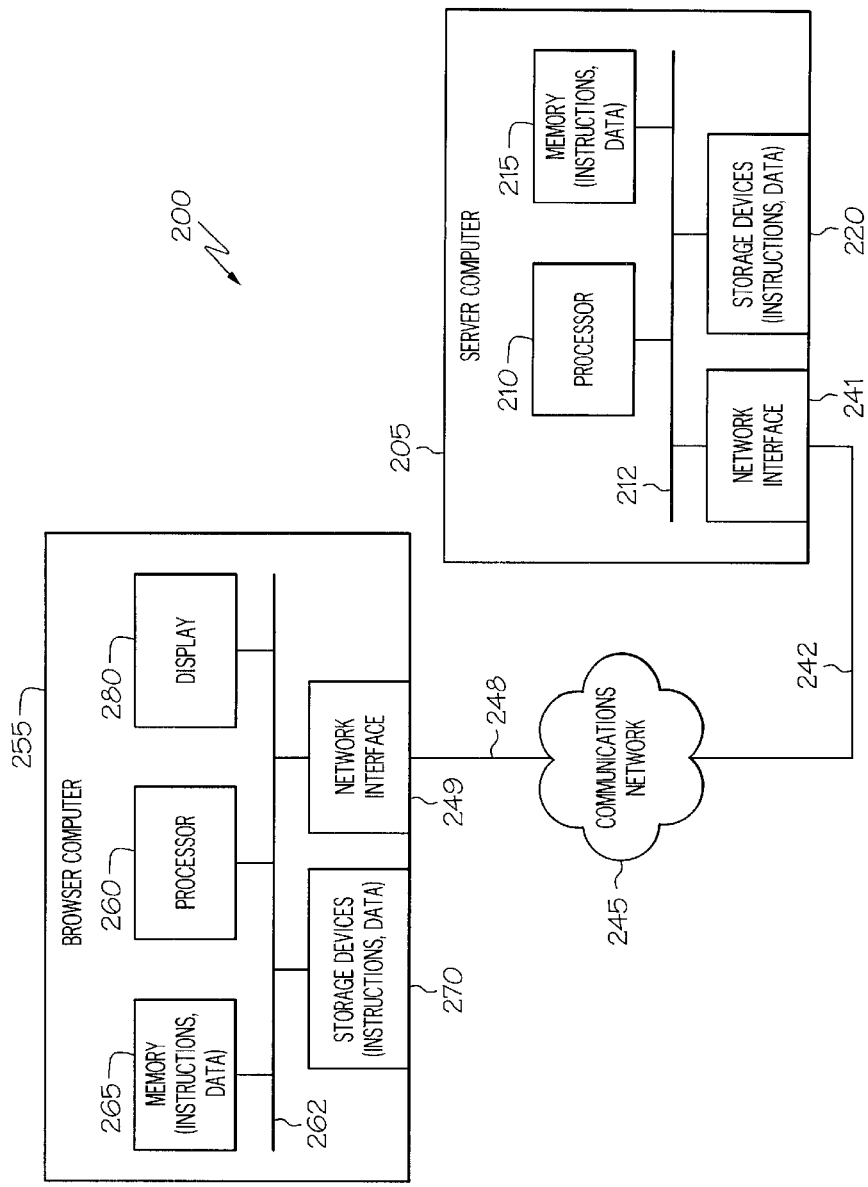
FIG. 2 is a block diagram of an exemplary operating environment in which the invention may be practiced in accordance with the present invention.

FIG. 2 and its discussion herein are intended to provide a description of a general computing environment in which the present invention can be practiced. The present invention is not limited to a single computing environment. Moreover, the architecture and functionality of the present invention as taught herein and would be understood by one skilled in the art is extensible to an unlimited number of computing environments and embodiments in keeping with the scope and spirit of the present invention.

In FIG. 2, an exemplary operating environment is illustrated in which the present invention may be practiced. The present invention provides for various methods, computer-readable medium containing computer-executable instructions, and apparatus for presenting, manipulating and serving an immersive image for presentations. FIG. 2 will first be described, and followed by a discussion of an embodiment and various aspects of the present invention in FIG. 3, and another embodiment and various aspects of the present invention in FIGS. 4–7.

Turning now to FIG. 2, illustrated is an exemplary operating environment and embodiment of the present invention. Illustrated are browser/browser computer 255, communications network 245, and server/server computer 205. The term "browser" as used herein refers to software and/or hardware embodying the functionality to request and/or display information locally or over a network. A browser embodying the present invention can be implemented in software as one or more programs, objects, agents, executable images, processes, threads, etc.; directly in hardware; or any combination of software and/or hardware. Similarly, the term "server" as used herein refers to software and/or hardware embodying the functionality to receive requests and/or transmit information locally or over a network to a client, another server, and/or a browser. A server embodying the present invention can be implemented in software as one or more programs, objects, agents, executable images, processes, threads, etc.; directly in hardware; or any combination of software and/or hardware.

Browser computer 255 typically comprises a standard computer platform or a specialized computer platform (e.g., a WebTV platform), including, but not limited to a desktop computer, a laptop computer, a handheld computer, a personal data assistant, (e.g., PalmPilot), or even a browser-enabled microwave oven. In an embodiment, browser computer 255 comprises a processor 260, memory 265, storage devices 270, a network interface 249, and a display 280, which are electrically coupled via bus 262. Network interface 249 is connected to a communications network 245 (e.g., Internet, Web, private or public network) over a public or private telephone, cellular, wireless, satellite, local area and/or wide area network connection 248. Memory 265 is one type of computer-readable medium, and typically comprises random access memory (RAM), read only memory (ROM), integrated circuits, and/or other memory components. Memory 265 typically stores computer-executable instructions to be executed by processor 260 and/or data which is manipulated by processor 260 for implementing the browser functionality. Storage devices 270 are another type of computer-readable medium, and typically comprise disk drives, diskettes, networked services, tape drives, and other storage devices. Storage devices 270 typically store computer-executable instructions to be executed by processor 260 and/or data which is manipulated by processor 260 for implementing the browser functionality. Additionally, browser computer 255, communications network 245, and server computer 205 could be implemented in a single computer platform, with communications network 245 being an internal information sharing mechanism such as message passing or shared memory.

As used herein and contemplated by the present invention, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

Server computer 205 typically comprises a standard computer platform or a specialized computer platform (e.g., a computer platform optimized for retrieving information and sending information to clients), including, but not limited to one or more desktop computers, servers, mainframes, laptop computers, handheld computers, and personal data assistants. In an embodiment, server computer 205 comprises a processor 210, memory 215, storage devices 220, and a network interface 241, which are electrically coupled via bus 212. Network interface 241 is connected to a communications network 245 (e.g., Internet, Web, private or public network) over a public or private telephone, cellular, wireless, satellite, local area and/or wide area network connection 242. Memory 215 is one type of computer-readable medium, and typically comprises random access memory (RAM), read only memory (ROM), integrated circuits, and/or other memory components. Memory 215 typically stores computer-executable instructions to be executed by processor 210 and/or data which is manipulated by processor 210 for implementing the server functionality. Storage devices 220 are another type of computer-readable medium, and typically comprise disk drives, diskettes, networked services, tape drives, and other storage devices. Storage devices 220 typically store computer-executable instructions to be executed by processor 210 and/or data which is manipulated by processor 210 for implementing the server functionality.

Figure 1:
FIG. 1 is a block diagram of the a prior art immersive image.
Figure 3A:
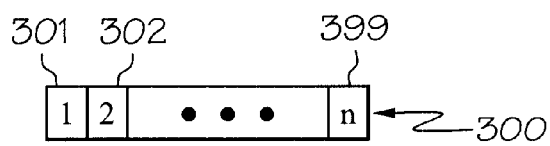
FIGS. 3A–3B are block diagrams illustrating an embodiment of the present invention.
Figure 3B:
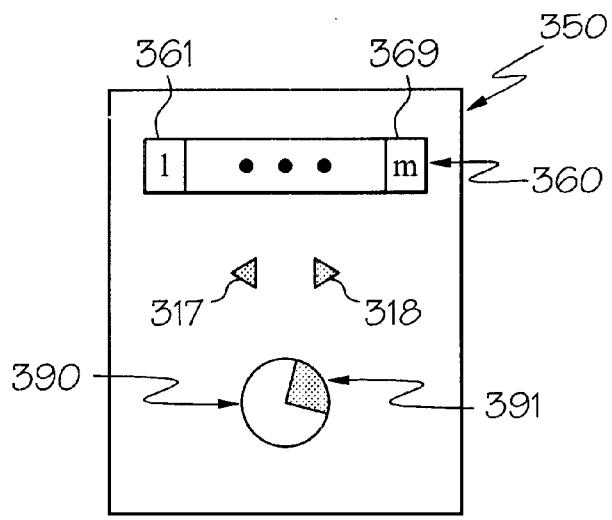

Turning now to FIGS. 3A–B, illustrated is one embodiment of the present invention for efficiently displaying an immersive image 300. Illustrated in FIG. 3A is immersive image 300, which can be segregated into n sub-images 301, 302, 399. The value of n can vary based on one or more of a multitude of implementation factors, such as the size of the immersive image, the type and/or characteristics of the information represented in the immersive image, capabilities of the browser used to present various views of the immersive image 300, and characteristics of the communications network, communications link, and/or server. Preferably, sub-images 301, 302, 399 contain overlapping portions of immersive image 300.

Illustrated in FIG. 3B is a screen 350 presented by an embodiment of a browser in accordance with the present invention. A view 360 of the immersive image 300 is presented, with view 360 having m sub-images 361–369 selected from sub-images 301, 302, 399, where 1<=m<=n; and sub-images 361–369 are typically contiguous (i.e., neighboring) sub-images within immersive image 300. In an embodiment, m has the value of two, and n has the value of eight. When m has a value of 1, typically sub-images 301, 302, 309 contain overlapping portions of immersive image 300; and when m has a value greater than one, typically sub-images 301, 302, 309 contain non-overlapping portions of immersive image 300; although, the present invention is not limited to these operational considerations.

User input devices (e.g., displayed left and right buttons) 317, 318 provide a mechanism for a user to request another view of the immersive image 300. Additional or alternative numerous input mechanisms could be used including hot keys, menus, buttons, mouse clicks, etc. In response to user input or other mechanisms (e.g., a timer), a signal is generated which indicates a request for a new view of the immersive image, with this new view showing a new perspective of the immersive image (e.g., an angular displacement from the current view, a zoom-in or out request, etc.)

In response to receipt of the signal indicating a requested new view (or an internally generated signal), the browser then requests any required additional information from a server, and displays the new view 360. Although the present invention is not so limited, this new view typically comprises the same m number of contiguous sub-images within immersive image 300, with the contiguous subset of sub-images shifted within immersive image 300 by some number of sub-images (typically by a value between 1 and m).

Additionally, a reference indicator 390 is typically displayed to give a user a viewing context by presenting a current view indicator 391 illustrative of a relative or absolute context of immersive image 300 currently being presented. Reference indicator 390 provides users viewing an immersive image 300 with a clear visual indicator of what portion of the immersive image 300 they are viewing, and a mechanism for navigating between views of the immersive image 300. In an embodiment, the visual current view indicator 391 is a "pie" shaped wedge displayed as a portion of a circular reference indicator 390. Also, when used on a computer with a mouse (or via other input mechanisms), a user can select a position of, or relative to reference indicator 390 or drag "wedges" (current view indicator 391) of reference indicator 390 to cause a corresponding portion of the immersive image 300 to be presented.

Additionally, the size of current view indicator 391 corresponds to the view being presented. For example, current view indicator 391 has an angular width of ninety degrees, which corresponds to showing one-forth of a 360 degree immersive image, with the right-ward appearance of current view indicator 391 depicting which portion of immersive image 300 is currently being presented. As contemplated by, and within the scope and spirit of the invention, many embodiments of reference indicator 390 and current view indicator 391 are possible such absolute position references including a compass and/or map indication corresponding to the current view, or other relative position indicators such as a relative number of the current view (e.g., view 3 of 12). Additionally, as the presented view 360 of immersive image 300 changes, the position and size of current view indicator 391 tracks the changed view 360. Moreover, if a user zooms into view a smaller portion of the image being displayed, the size of current view indicator 391 correspondingly decreases as well. For example, if the zoom went from ninety degrees to forty-five degrees, current view indicator 391 would halve in size.

Figure 4A:
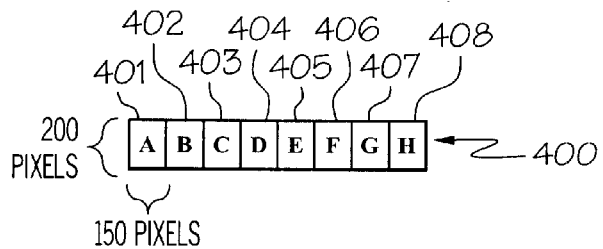
FIGS. 4A–4K are block diagrams illustrating another embodiment of the present invention.

Turning now to FIGS. 4A–K, illustrated is another embodiment of the present invention. First, shown in FIG. 4A is an immersive image 400 having an image size of 200 pixels by 1200 pixels, and being logically segregated into eight sub-images 401–408 identified by letters "A" to "H", each sub-image being non-overlapping and having the size of 200 pixels by 150 pixels. The listed dimensions of the immersive image and the number of sub-images are provided for illustrative purposes of a typical configuration. The embodiment of FIGS. 4A–K nor the present invention is limited to these quantities.

Figure 4B:
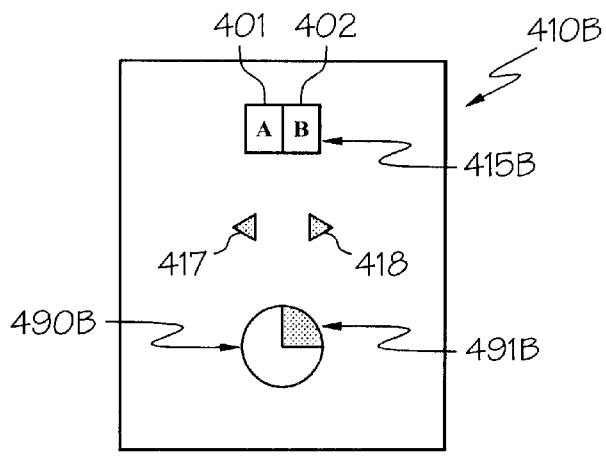

Illustrated in FIG. 4B is a display screen 410B showing a first view 415B of immersive image 400, with first view 415B composed of two sub-images 401, 402 identified by "A" and "B". Current view indicator 491B within reference indicator 490B provides a contextual reference of the currently displayed view 415B. When either button 417, 418 is selected by a user (e.g., using an input device such as a cursor and mouse), a signal is generated and received by the browser, which causes a next view to be shown. Alternatively, the signal indicating a pending request for a different view could be automatically generated based on a relative movement of the mouse, derived from a timing signal generator (e.g., creating a periodic signal, typically every few seconds), or based on numerous other methods and apparatus as understood by one skilled in the art and in keeping with the scope and spirit of the invention.

Figure 4C:
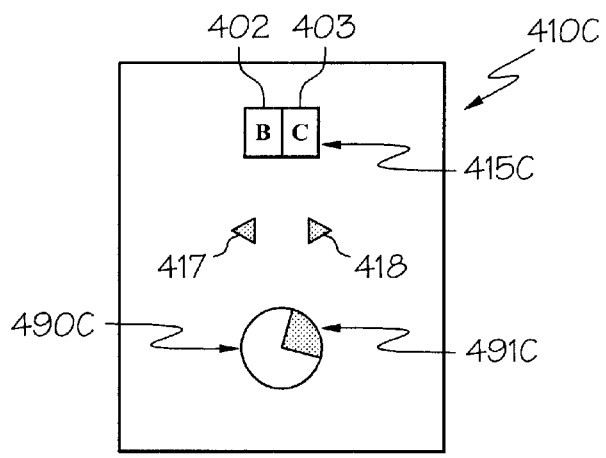
Figure 4D:
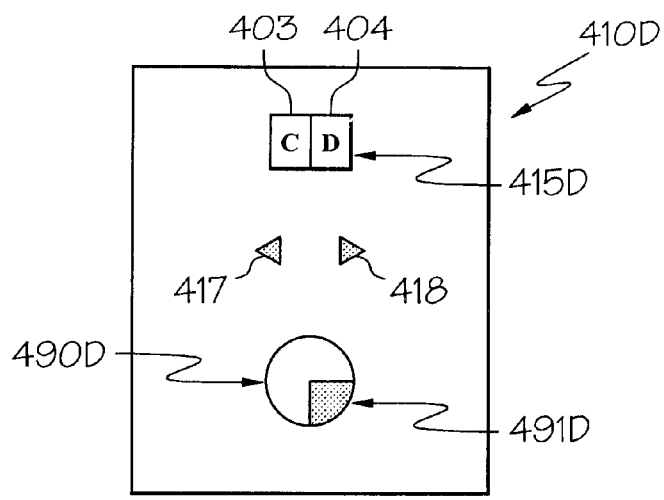
Figure 4E:
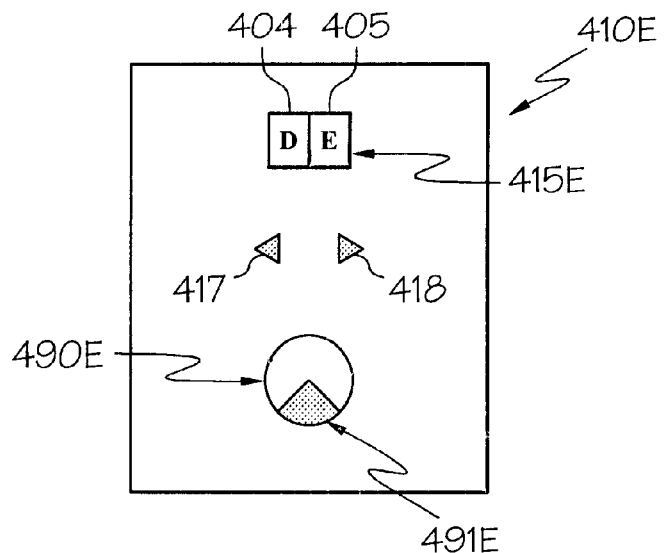
Figure 4F:
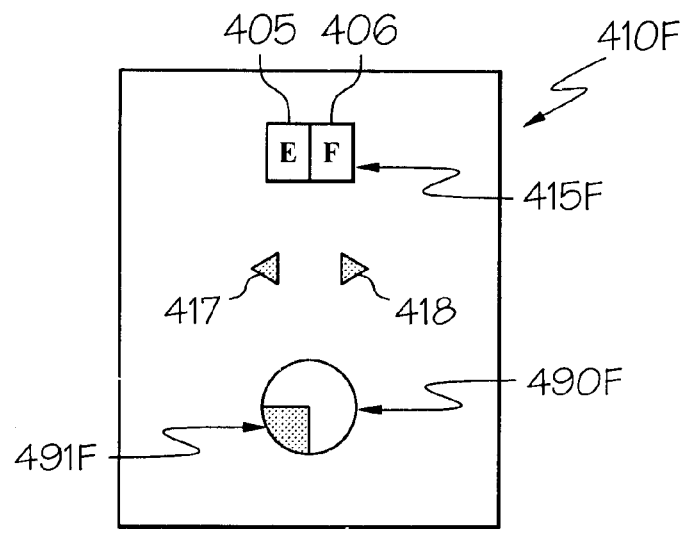
Figure 4G:
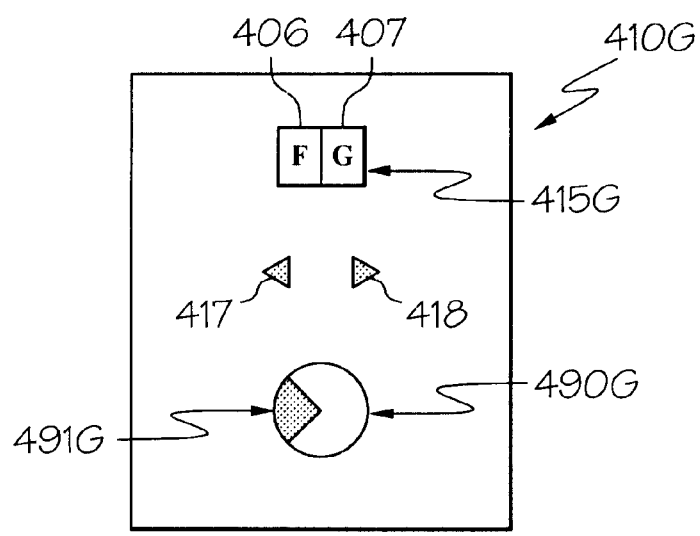
Figure 4H:
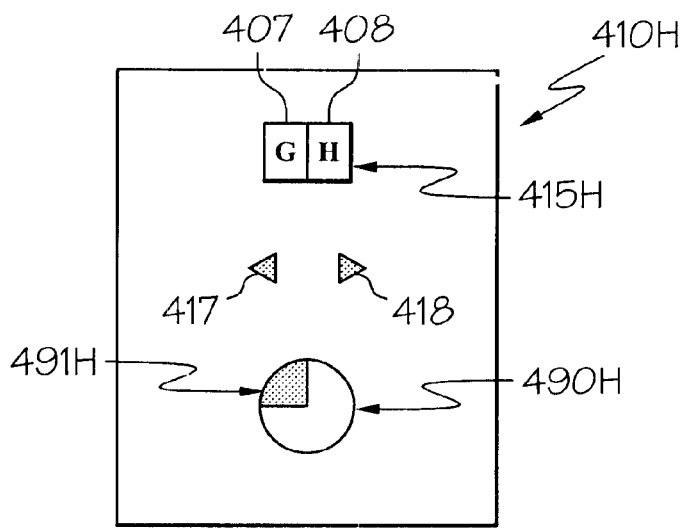
Figure 4I:
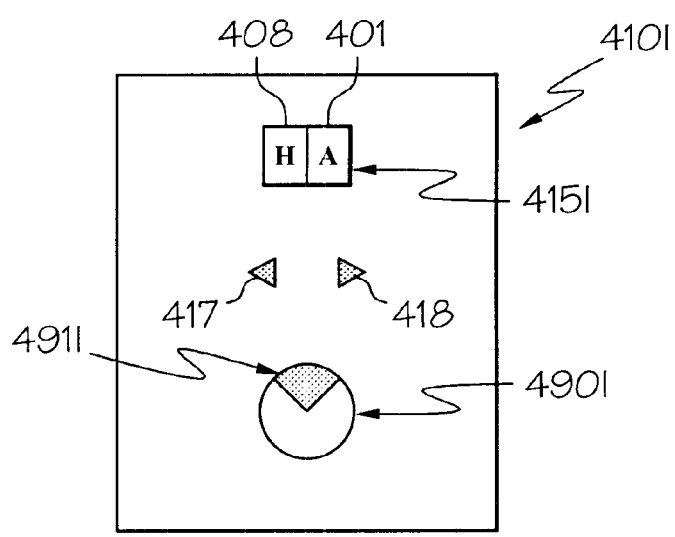

FIGS. 4B–I illustrate successive views of the immersive image 400 in a right-hand direction order, with FIG. 4I illustrating a wrap-around capability for presenting an immersive image. Typically, the wrap-around capability is especially useful for displaying an immersive image comprising a 360 degree view. The invention also provides for a non-wrapping capability, which typically would be used to view an immersive image of less than 360 degrees so that the user doesn't loose spatial context of the displayed views, although the present invention allows the use of wrapping or non-wrapping modes with any immersive image.

Illustrated in FIG. 4C is a screen 410C comprising a view 415C of immersive image 400 having sub-images 402, 403 identified by "B" and "C", and reference indicator 490C having current view indicator 491C. Illustrated in FIG. 4D is a screen 410D comprising a view 415D of immersive image 400 having sub-images 403, 404 identified by "C" and "D", and reference indicator 490D having current view indicator 491D. Illustrated in FIG. 4E is a screen 410E comprising a view 415E of immersive image 400 having sub-images 404, 405 identified by "D" and "E", and reference indicator 490E having current view indicator 491E. Illustrated in FIG. 4F is a screen 410F comprising a view 415F of immersive image 400 having sub-images 405, 406 identified by "E" and "F", and reference indicator 490F having current view indicator 491F. Illustrated in FIG. 4G is a screen 410G comprising a view 415G of immersive image 400 having sub-images 406, 407 identified by "F" and "G", and reference indicator 490G having current view indicator 491G. Illustrated in FIG. 4H is a screen 410H comprising a view 415H of immersive image 400 having sub-images 407, 408 identified by "G" and "H", and reference indicator 490H having current view indicator 491H. Illustrated in FIG. 4I is a screen 410I comprising a view 415I of immersive image 400 having sub-images 408, 401 identified by "H" and "A", and reference indicator 490I having current view indicator 491I.

Figure 4J:
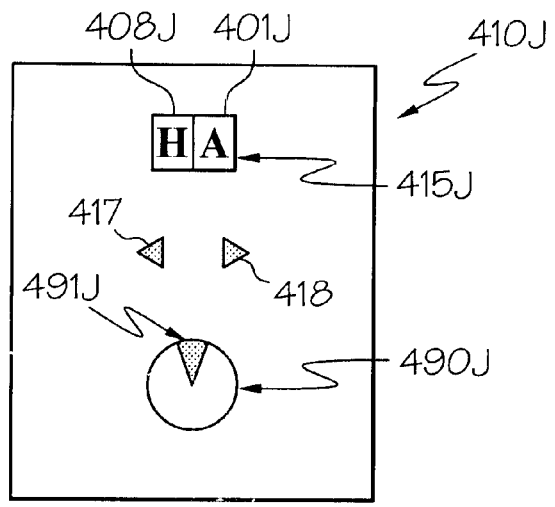
Figure 4K:
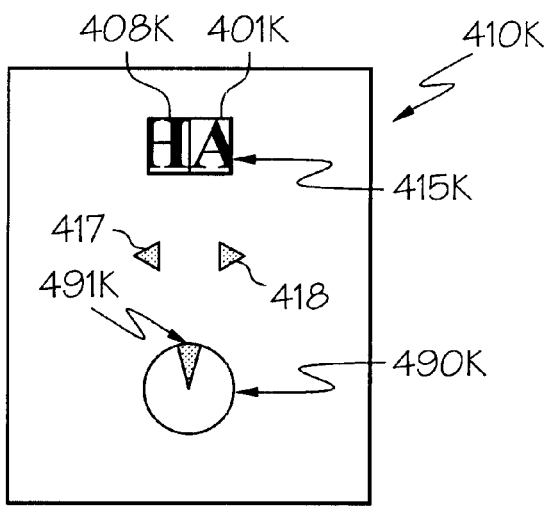

Additionally illustrated by FIG. 4I in conjunction with FIGS. 4J–K, is the zoom in and out capabilities for presenting an immersive image 400, and the visual perspective changes provided by reference indicators 490I–K and current view indicators 491I–K. Illustrated in FIG. 4J is a screen 410J comprising a view 415J of immersive image 400 having sub-images 408J, 401J identified by "H" and "A", and reference indicator 490J having current view indicator 491J, wherein the view 415J is a zoom of two times view 415I (FIG. 4I), and correspondingly current view indicator 491J is one-half the size of current view indicator 491I (FIG. 4I). Similarly, illustrated in FIG. 4K is a screen 410K comprising a view 415K of immersive image 400 having sub-images 408K, 401K identified by "H" and "A", and reference indicator 490K having current view indicator 491K, where the current view 415K is a further zoom in of view 415J (FIG. 4J) which is also reflected by current view indicator 491K.

Figure 5:
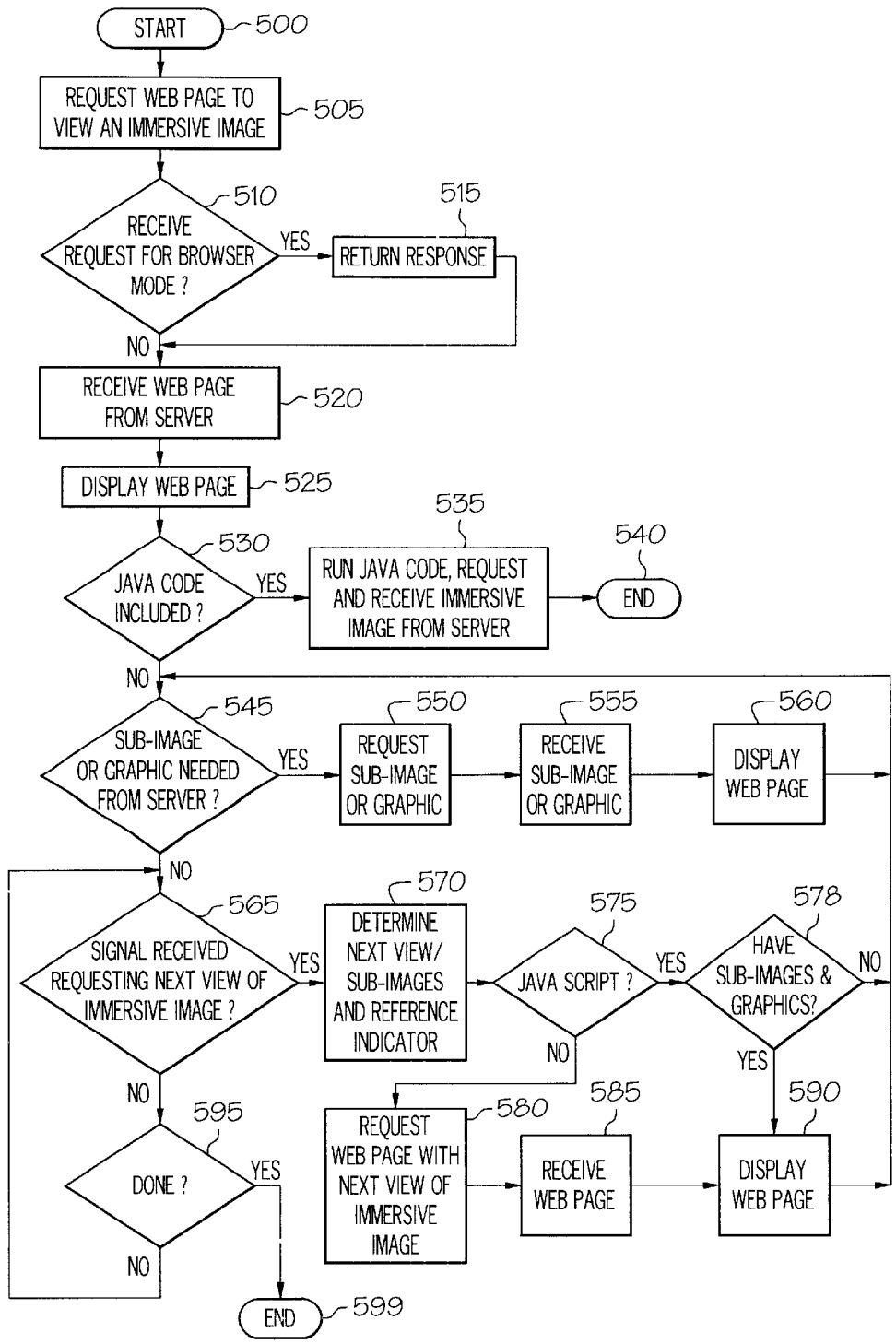
FIGS. 5–6 are flow diagrams illustrating the steps performed by a presenting system (e.g., a browser) for presenting views of an immersive image in an embodiment of the present invention.
Figure 6:
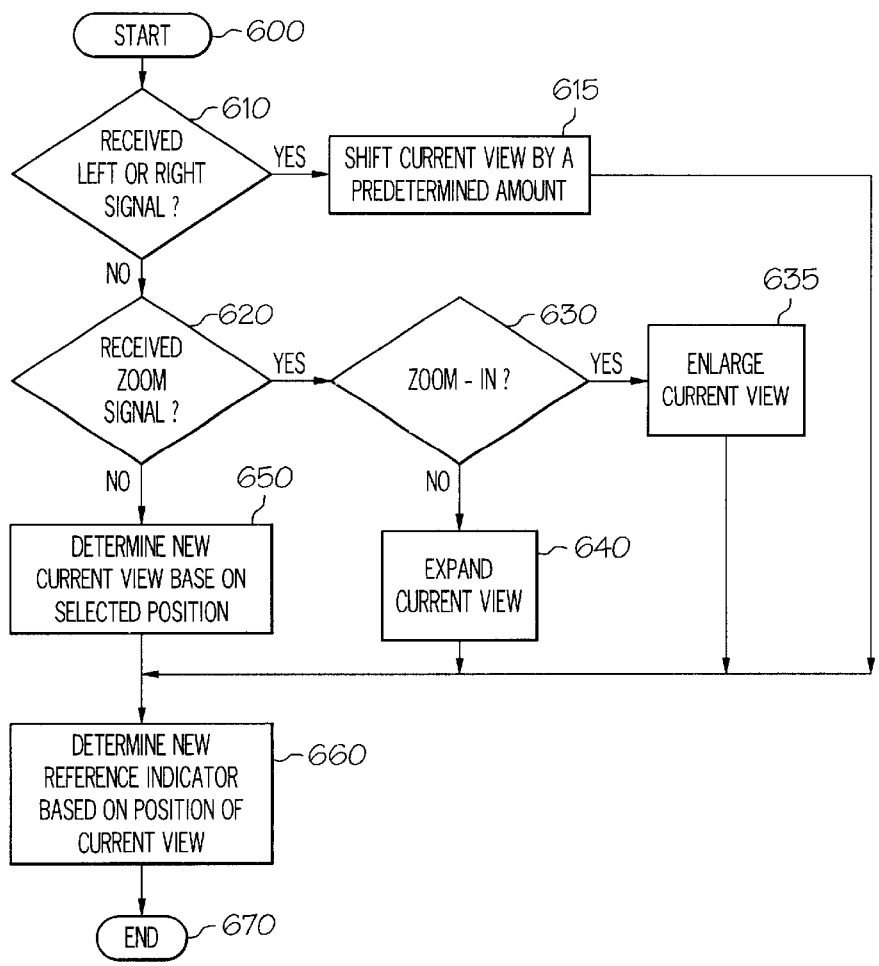

Turning now to FIGS. 5–6, illustrated are steps performed by a browser in one of numerous possible embodiments of the present invention. Processing begins at step 500, and proceeds to step 505 where the browser requests a Web page referencing an immersive image to view. Typically, this is request is generated in response to user input such as entering a Web page address or selecting a hyperlink. Next, in step 510, if the browser receives a request for its type, the browser's operational mode is returned to the requesting server in step 515. Next, the browser receives the Web page from the server (step 520) and displays it (step 525). If the received Web page includes Java code as determined in step 530, the Java code is executed in step 535 to cause an immersive image to be received from the server, and to allow a user to view the immersive image. A portion of the functionality performed by the Java code is illustrated in FIG. 6, and described hereinafter in relation to step 570. When the Java code is completed (i.e., the user is finished viewing the immersive image), processing then ceases in step 540.

Otherwise, if a sub-image or graphic is needed from the server as determined in step 545, the browser requests the sub-image or graphic (step 550), receives the sub-image or graphic (step 555), and displays the Web page with the received sub-image or graphic (step 560). Depending on the specific embodiment of the present invention, the browser can request and receive all sub-images and graphics into a memory storage (e.g., cache memory) for expediency in switching between views.

Next, if a signal (e.g., generated by user input or a timing generator) is received requesting a next view of the immersive image as determined in step 565, steps 570–590 are performed to display the next view of the immersive image and to retrieve any required information from the server. First in step 570, the next view is determined based on the received signal and possibly the location of a displayed reference indicator and/or current view indicator as previously described herein. An embodiment of this determination is illustrated in FIG. 6, to which we now turn.

First, processing begins at step 600, and proceeds to step 610 where the signal is checked to determine whether a request was made to shift the current view of the immersive image to the next left or right view. If so, step 615 is performed to shift the current view by some predetermined amount, such as one sub-image, by a predetermined angular displacement measured by pixels, degrees of view, or by numerous other known image shifting mechanisms. Otherwise, if the signal requests a zoom operation as determined in step 620, then if a zoom-in operation is requested as determined in step 630, then the current view is enlarged in step 635; and otherwise the current view is expanded or shrunk in step 640. Otherwise, the new current view is determined in step 650 based on a selected position of the screen or other requesting mechanism; typically, by manipulating the reference indicator and current view indicator as previously described herein. Finally, step 660 is performed (after the new current view has been determined in steps 610–650) to determine the new reference indicator (and current view indicator) based on the new current view. Processing of the flow diagram illustrated in FIG. 6 then ceases with step 670, and processing returns to the appropriate place in FIG. 5.

Returning to FIG. 5, after step 570 has been performed to determine the next view of the immersive image to be displayed, step 575 is performed to determine if the Web page contains Java Script. If so, and if all the sub-images and graphics are locally stored as determined in step 578, then the Web page comprising the next view is displayed in step 590, and processing then loops back to step 545 to retrieve any additional information required from the server. Otherwise, Java Script is not used within the current Web page, and the browser requests a new Web page containing the requested next view from the server (or from the browser's cache) in step 580. The browser then receives the Web page (step 585), displays the Web page (step 590), and loops back to step 545 to retrieve any needed information from the server and to display the received items.

When processing is complete as determined in step 595, processing ends at step 599; otherwise the browser proceeds in a loop to wait for a request to see a next view. As appreciated by one skilled in the art, numerous other embodiments of the browser are possible, such as parallel and object-oriented programming implementations and other design and implementation decisions, while keeping within the scope and spirit of the present invention.

Figure 7:
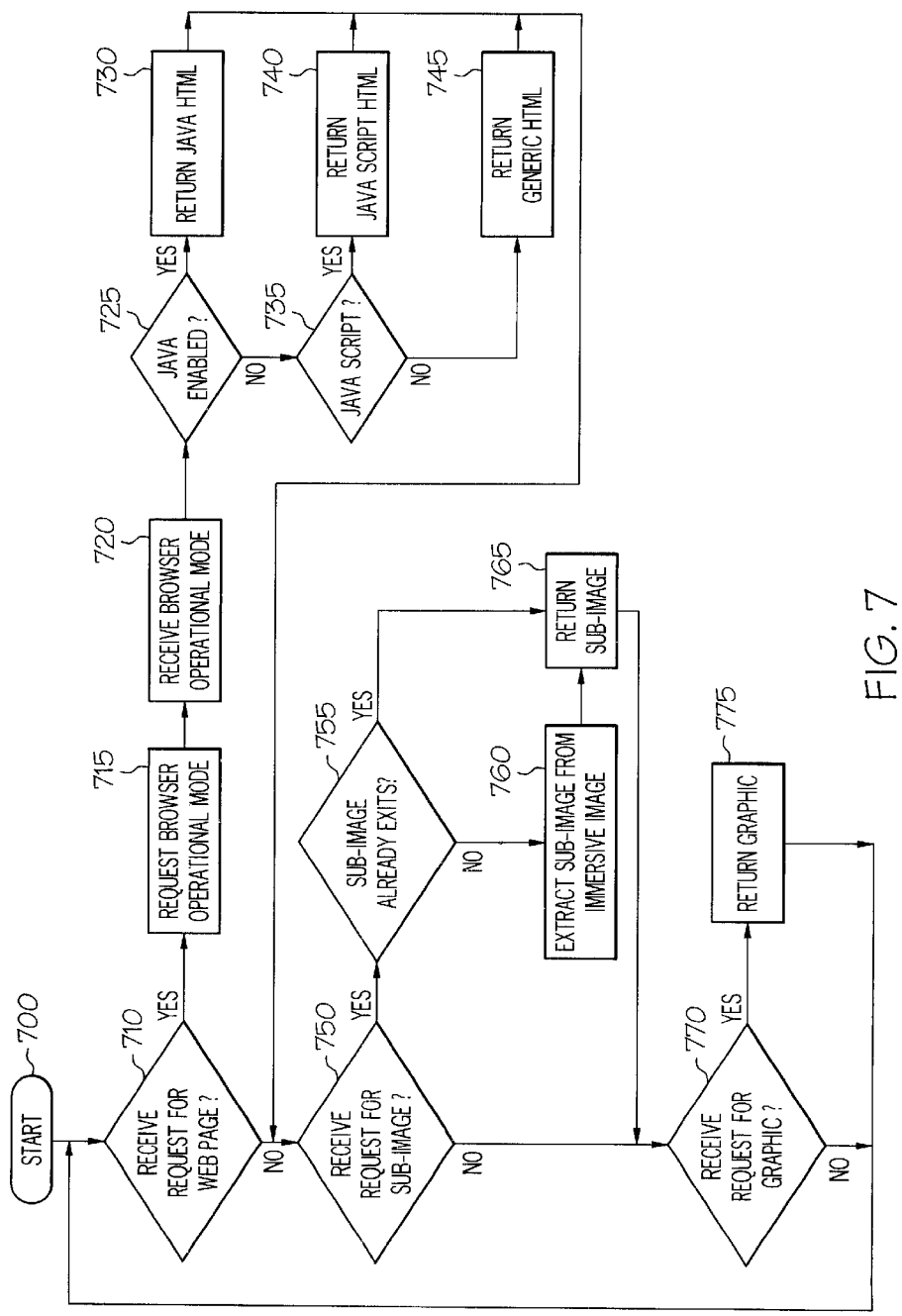
FIG. 7 is a flow diagram illustrating the steps performed by a system (e.g., a server) for providing components views of an immersive image to a client in an embodiment of the present invention.

Turning now to FIG. 7, illustrated are the steps performed by an embodiment of the server in accordance with the present invention. As illustrated, steps 710, 750 and 770 comprise a case statement with a main loop for processing received requests. As appreciated by one skilled in the art, numerous other embodiments of the server are possible, such as parallel and object-oriented programming implementations and other design and implementation decisions, while keeping within the scope and spirit of the present invention.

Returning to the present embodiment, processing commences with step 700, and proceeds to step 710 to determine whether a request for a Web page has been received. If a Web page has been requested, then the server requests the operational mode of the browser (step 715) and receives the operational mode response (step 720). Alternatively, a default browser operational mode could be used in place of requesting the browser's operational mode or when no operational mode response is received. Next, if the requesting browser is Java capable as determined in step 725, the Java HTML is returned to the browser in step 730. Otherwise, if the browser supports Java Script as determined in step 735, then the Java Script HTML is returned to the browser in step 740; otherwise, the generic HTML is returned to the browser in step 745.

Next, processing continues at step 750 wherein the server determines whether a request has been received for a sub-image of an immersive image. If so, then if the sub-image does not already exist as determined in step 755, then the sub-image is extracted from the immersive image using one of numerous available image manipulation techniques (step 760). The sub-image is then returned to the requesting client (step 765).

Next, processing continues at step 770 to determine whether a graphic (e.g., a reference indicator illustrating a view within the immersive image) is requested from by a client; and if so, the requested graphic is returned to the client in step 775. Processing then loops back to step 710 to continually process received requests.

In view of the many possible embodiments to which the principles of our invention may be applied, it will be appreciated that the embodiments and aspects thereof described herein with respect to the drawings/figures are only illustrative and should not be taken as limiting the scope of the invention. To the contrary, the invention as described herein contemplates all such embodiments as may come within the scope of the following claims and equivalents thereof.

What is claimed is:

1. A method of presenting an immersive image, the method comprising:
   receiving a request to view the immersive image;
   receiving an indication of an operational mode of a browser in connection with viewing the immersive image, the operational mode identifying a present mode to be used by the browser in presenting the immersive image;
   sending HyperText Markup Language (HTML) code including a Java script and the immersive image to the browser if the present mode indicates the browser is Java enabled; and
   sending a first view HTML source and first and second sub-images of the immersive image to the browser if the operational mode indicates the browser is not Java enabled.

2. The method of claim 1, wherein the second immersive image view is determined from a location indicated by a signal and a position of, or a point within, the reference indicator.

3. The method of claim 1, further comprising generating a plurality of sub-images from the immersive image, the generated sub-images including the first and second sub-images.

4. The method of claim 3, wherein generating the plurality of sub-images is performed in response to the receipt of the request to view the immersive image.

5. The method of claim 3, further comprising determining whether or not the plurality of sub-images already exist, wherein generating the plurality of sub-images is performed after determining that the plurality of sub-images do not already exist.

6. The method of claim 3, wherein the first and second sub-images consist of non-overlapping neighboring portions of the immersive image.

7. The method of claim 1, wherein the first and second sub-images contain overlapping portions of the immersive image.

8. The method of claim 1, further comprising dynamically generating the first and second sub-images directly from the immersive image in response to the receipt of the request to view the immersive image and operational mode of the browser.

9. The method of claim 1, further comprising:
   sending a first view reference indicator corresponding to a first view of the immersive image; and
   sending a second view reference indicator corresponding to a second view of the immersive image.

10. The computer-readable medium of claim 9, wherein the immersive image consists of a number n sub-images, and the first and second views each consist of a number m of the n sub-images.

11. The computer-readable medium of claim 10, wherein the n sub-images consist of non-overlapping portions of the immersive image.

12. The computer-readable medium of claim 11, wherein the value of n is eight and the value of m is two.

13. The computer-readable medium of claim 10, wherein the n sub-images contain overlapping portions of the immersive image.

14. The computer-readable medium of claim 9, wherein the second view is determined from a location indicated by a signal and a position of, or a point within, the reference indicator.

15. The computer-readable medium of claim 9, wherein the first and second sub-images consist of non-overlapping neighboring portions of the immersive image.

16. The method of claim 1, wherein the immersive image consists of a number n sub-images, and the first and second views each consist of a number m of the n sub-images.

17. The method of claim 16, wherein the n sub-images consist of non-overlapping portions of the immersive image.

18. The method of claim 17, wherein the value of n is eight and the value of m is two.

19. The method of claim 16, wherein the n sub-images contain overlapping portions of the immersive image.

20. The method of claim 1, wherein the second view is determined from a location indicated by a signal and a position of, or a point within, the reference indicator.

21. The method of claim 1, wherein the first and second sub-images consist of non-overlapping neighboring portions of the immersive image.

22. The computer readable medium of claim 1, wherein the second immersive image view is determined from a location indicated by a signal and a position of, or a point within, the reference indicator.

23. The computer readable medium of claim 1, further comprising generating a plurality of sub-images from the immersive image, the generated sub-images including the first and second sub-images.

24. The computer readable medium of claim 23, wherein generating the plurality of sub-images is performed in response to the receipt of the request to view the immersive image.

25. The computer readable medium of claim 23, further comprising determining whether or not the plurality of sub-images already exist, wherein generating the plurality of sub-images is performed after determining that the plurality of sub-images do not already exist.

26. The computer readable medium of claim 23, wherein the first and second sub-images consist of non-overlapping neighboring portions of the immersive image.

27. The computer readable medium of claim 23, wherein the first and second sub-images contain overlapping portions of the immersive image.

28. A computer readable medium having stored thereon data representing sequences of instructions, the sequences of instructions which, when executed by a processor, cause the processor to:

receive a request from a browser to view an immersive image;

receive an indication of an operational mode of the browser in connection with viewing an immersive image, the operational mode identifying a present mode to be used by the browser in presenting the immersive image;

send HyperText Markup Language (HTML) code including a Java script and the immersive image to the browser if the present mode indicates the browser is Java enabled; and send a first view HTML source and first and second sub-images of the immersive image to the browser if the operational mode indicates the browser is not Java enabled.

29. The computer readable medium of claim 28, wherein the processor further:

sends a first view reference indicator corresponding to the first view of the immersive image; and sends a second view reference indicator corresponding to the second view of the immersive image.

30. The computer readable medium of claim 28, further comprising dynamically generating the first and second sub-images directly from the immersive image in response to receipt of the request to view the immersive image and operational mode of the browser.

31. A system comprising:

a storage device having stored therein instructions for presenting an immersive image; and a processor coupled with the storage device to execute the instructions for presenting the immersive image, the instructions causing the processor to:

receive an indication of an operational mode of a browser viewing an immersive image, the operational mode identifying a present mode to be used by the browser in presenting the immersive image, send HTML code including a Java script and the immersive image to the browser if the operational mode indicates the browser is Java enabled, and send a first view HTML source and first and second sub-images of the immersive image to the browser if the operational mode indicates not Java enabled.

32. The system of claim 31, wherein the processor further:

sends a first view reference indicator corresponding to a first view of the immersive image, and sends a second view reference indicator corresponding to a second view of the immersive image.

33. The system of claim 31, further comprising dynamically generating the first and second sub-images directly from the immersive image in response to the receipt of the request to view the immersive image and operational mode of the browser.

34. The system of claim 31, wherein the immersive image consists of a number n sub-images, and the first and second views each consist of a number m of the n sub-images.

35. The system of claim 34, wherein the n sub-images consist of non-overlapping portions of the immersive image.

36. The system of claim 35, wherein the value of n is eight and the value of m is two.

37. The system of claim 34, wherein the n sub-images contain overlapping portions of the immersive image.

38. The system of claim 31, wherein the second view is determined from a location indicated by a signal and a position of, or a point within, the reference indicator.

39. The system of claim 31, wherein the first and second sub-images consist of non-overlapping neighboring portions of the immersive image.

40. The system of claim 31, wherein the second immersive image view is determined from a location indicated by a signal and a position of, or a point within, the reference indicator.

41. The system of claim 31, further comprising generating a plurality of sub-images from the immersive image, the generated sub-images including the first and second sub-images.

42. The system of claim 41, wherein generating the plurality of sub-images is performed in response to the receipt of the request to view the immersive image.

43. The system of claim 41, further comprising determining whether or not the plurality of sub-images already exist, wherein generating the plurality of sub-images is performed after determining that the plurality of sub-images do not already exist.

44. The system of claim 41, wherein the first and second sub-images consist of non-overlapping neighboring portions of the immersive image.

45. The system of claim 41, wherein the first and second sub-images contain overlapping portions of the immersive image.

* * * * *